United States Patent
Zhang et al.

(10) Patent No.: US 9,343,239 B2
(45) Date of Patent: May 17, 2016

(54) SOLID ELECTROLYTIC CAPACITOR AND IMPROVED METHOD FOR MANUFACTURING A SOLID ELECTROLYTIC CAPACITOR

(71) Applicant: Kemet Electronics Corporation, Simpsonville, SC (US)

(72) Inventors: Hong Zhang, Jiangsu (CN); Qingping Chen, Simpsonville, SC (US); Randolph S. Hahn, Simpsonville, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 0 days.

(21) Appl. No.: 13/896,672

(22) Filed: May 17, 2013

(65) Prior Publication Data
US 2014/0340819 A1    Nov. 20, 2014

(51) Int. Cl.
  *H01G 9/00*   (2006.01)
  *H01G 9/028*  (2006.01)
  *H01G 9/012*  (2006.01)
  *H01G 9/15*   (2006.01)

(52) U.S. Cl.
  CPC ........... *H01G 9/0032* (2013.01); *H01G 9/0036* (2013.01); *H01G 9/012* (2013.01); *H01G 9/028* (2013.01); *H01G 9/15* (2013.01); *Y10T 29/417* (2015.01)

(58) Field of Classification Search
  CPC .................................................. H01G 9/0036
  See application file for complete search history.

(56) References Cited

U.S. PATENT DOCUMENTS

| 8,124,277 B2 | 2/2012 | Anada et al. |
| 2005/0248910 A1 | 11/2005 | Merker |
| 2011/0102973 A1* | 5/2011 | Reuter et al. .................. 361/528 |
| 2012/0057275 A1 | 3/2012 | Intelmann et al. |
| 2012/0206860 A1 | 8/2012 | Chen et al. |

FOREIGN PATENT DOCUMENTS

| JP | 2004-128033 | 4/2004 |
| JP | 2005-109248 | 4/2005 |
| JP | 2007-180260 | 7/2007 |

* cited by examiner

*Primary Examiner* — Seahvosh Nikmanesh
(74) *Attorney, Agent, or Firm* — Joseph T. Guy; Perkins Law Firm, LLC

(57) ABSTRACT

An improved process for forming a capacitor, and improved capacitor formed thereby is described. The process includes: providing an anode comprising a dielectric thereon; applying a first layer of an intrinsically conducting polymer on the dielectric to form a capacitor precursor; applying at least one subsequent layer of an intrinsically conducting polymer on the first layer from a dispersion; and treating the capacitor precursor at a temperature of at least 50° C. no more than 200° C. at a relative humidity of at least 25% up to 100%, or fusing the layered structure by swelling the layered structure with a liquid and at least partially removing the liquid.

21 Claims, 3 Drawing Sheets

SOLID ELECTROLYTIC CAPACITOR AND IMPROVED METHOD FOR MANUFACTURING A SOLID ELECTROLYTIC CAPACITOR

BACKGROUND

The present invention is related to an improved solid electrolytic capacitor and an improved method of manufacturing a solid electrolytic capacitor. More specifically, the present invention is related to an improved treatment method which provides for improvements in the coating quality and physical properties of the finished capacitor.

Solid electrolytic capacitors have been widely used for many years throughout the industry. Of particular interest herein is a solid electrolytic capacitor comprising a cathode of an intrinsically conducting polymer such as polyaniline, polythiophene or polypyrroles. The polymers are usually either formed in-situ or by dipping into a slurry of polymer. With in-situ formation a capacitor precursor is introduced into a monomer solution wherein the monomer is polymerized either electrochemically or by chemical means.

It is well known in the art that when forming a coating from polymer slurry achieving an adequate coating on the edges and corners is very difficult. The slurry tends to pull away from the edges and corners, believed to be due to surface tension driven capillary effects. The result is thin layers and, in some cases, voids or holes within the coating, which is detrimental to achieving a high quality capacitor. One of skill in the art typically applies multiple layers, beyond those needed for capacitance, to insure adequate coverage of the edges and corners.

Efforts to mitigate edge and corner thinning are described throughout the literature as exemplified in U.S. Pat. Publ. No. 2012/0057275 wherein cross-linkers comprising at least one diamine, triamine, oligamine or polymeric amine is applied before the application of the polymer slurry. While advantageous, the use of strong ionic acid anions with the cross-linking technology has now been understood to be detrimental due to corrosion of the underlying anode. This is a particular problem with an aluminum anode wherein the corrosion occurs rapidly.

Yet another problem with the cross-linkers is that each slurry layer tends to dry and form a skin. Subsequent layers then do not adequately migrate through the skin into previous layers and the layers are joined by adhesion not cohesion. The result is the formation of a cathode wherein discrete layers separate, or delaminate, under harsh conditions thereby decreasing conductivity between adjacent layers and increasing equivalent series resistance (ESR). The stability and reliability of capacitors made with the layered coating of conductive polymer is also undesirable.

In spite of the advances made in the art there is still a significant need for capacitors which maintain their properties in adverse conditions without loss of capacitance due to anode corrosion or an increase in ESR due to cathode degradation and layer separation.

SUMMARY

It is an object of the invention to provide an improved capacitor, and particularly capacitors which are not detrimentally impacted by adverse conditions with regards to capacitance or ESR performance.

It is another object of the invention to provide an improved method of manufacturing a capacitor which provides for adequate edge and corner coverage yet does not detrimentally impact the properties of the capacitor, such as capacitance and ESR, under adverse environmental conditions.

These and other advantages, as will be realized, are provided in a process for forming a capacitor comprising:
providing an anode comprising a dielectric thereon;
applying a first layer of an intrinsically conducting polymer on the dielectric to form a capacitor precursor;
applying at least one subsequent layer of an intrinsically conducting polymer on the first layer from a dispersion; and
treating the capacitor precursor at a temperature of at least 50° C. no more than 200° C. at a relative humidity of at least 25% up to 100%.

Yet another embodiment is provided in a process for forming a capacitor comprising:
providing an anode comprising a dielectric thereon;
applying a first layer of an intrinsically conducting polymer on the dielectric to form a capacitor precursor;
applying at least one subsequent layer of an intrinsically conducting polymer on the first layer from a dispersion thereby forming a layered structure;
fusing the layered structure by swelling the layered structure with a liquid and at least partially removing the liquid.

DESCRIPTION

The present invention is directed to an improved capacitor and improved method of making a capacitor, particularly a solid electrolytic capacitor comprising intrinsically conductive polymer, with improved stability under adverse and processing conditions. More specifically, the present invention provides a method of fusing conductive polymer layers by using high temperature and high humidity treatment, by soaking the layered structure in a liquid or solution, or by vapor treatment with some selected liquid that helps to swell and fuse the distinctive layers. This improves the bonding between adjacent layers of intrinsically conductive polymer The invention will be described with reference to the figures which form an integral, non-limiting component of the disclosure. Throughout the disclosure similar elements will be numbered accordingly.

Figure 1:
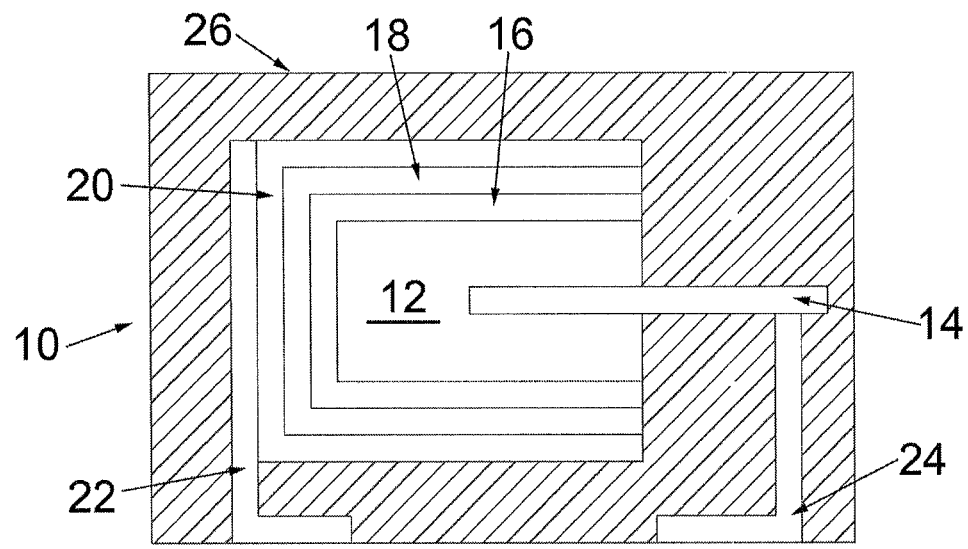
FIG. 1 is a cross-sectional schematic view of an embodiment of the invention.

An embodiment of the invention is illustrated in schematic cross-sectional view in FIG. 1. In FIG. 1, a capacitor, generally represented at 10, comprises an anode, 12, with an anode wire, 14, extending therefrom. A dielectric, 16, is on the anode at least partially encasing the anode. A conductive polymeric cathode, 18, is on the dielectric and separated from the anode by the dielectric. Adhesion layers, 20, provide a layer which allows adhesion to a cathode external termination, 22. An anode external termination, 24, is in electrical contact with the anode wire. The entire capacitor, except for the lower portion of the anode and cathode external terminations, is preferably encased in a non-conductive matrix, 26, or sealed in a hermetically sealed container as known in the art.

Figure 2:
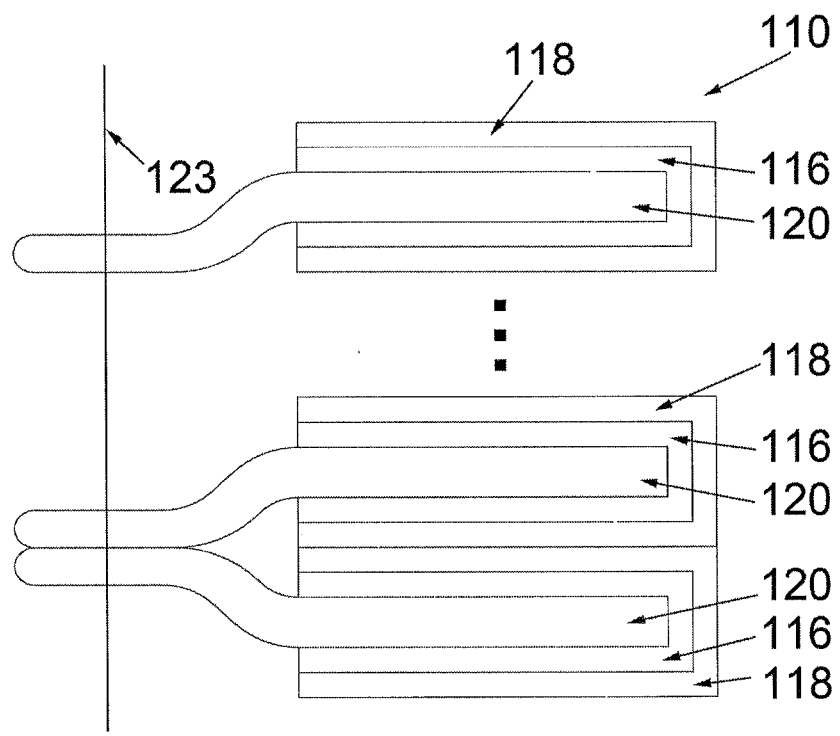
FIG. 2 is a cross-sectional schematic partially-exploded view of an embodiment of the invention.

An embodiment of the invention is illustrated in FIG. 2 wherein a capacitor is generally represented at 110. A series of anodes, 120, are arranged in parallel fashion. Each anode has a dielectric, 116, thereon. A conductive polymer cathode, 118, is on each dielectric. The anodes are fused at 123 and the cathodes are commonly terminated.

The present invention provides a method for fusing conductive polymer layers by using high temperature and high humidity treatment, by soaking the layered structure in a liquid or solution, or by vapor treatment with some selected liquid that helps to swell and fuse the distinctive layers. This improves the bonding between adjacent layers of intrinsically conductive polymer and results in improved ESR and ESR stability.

Figure 3:
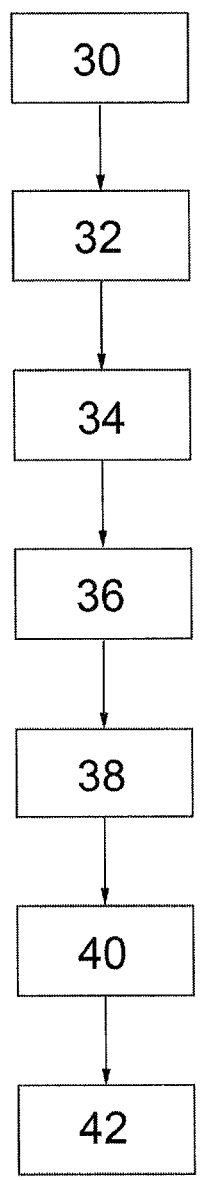
FIG. 3 is a flow chart representation of an embodiment of the invention.

An embodiment of the invention is illustrated in flow-chart form in FIG. 3. In FIG. 3, an anode is provided at 30. A dielectric is formed on the anode at 32. An initial coating of primer is applied at 34 followed by coating with a conductive polymer, preferably as a slurry, at 36. Subsequent layers are applied at 38. At least two polymer coatings are applied with the number based on the desired thickness and completeness of coverage. A particularly preferred conductive polymer is poly 3,4-ethylenedioxythiophene (PEDT). PEDT slurry is commercially available from Heraeus as Clevios® KV2. The layers are dried and then fused at 40, preferably, at a temperature of at least 50° C. to no more than 200° C. and a relative humidity of at least 25-100%. More preferably the temperature is at least 115° C. to no more than 130° C. More preferably the relative humidity is at least 75%. Once the desired thickness and coverage of conductive polymer is achieved the capacitor is finished at 42 by forming anodic and cathode external terminations and optionally encapsulating or sealing the capacitor.

While not limited to any theory, it is hypothesized that the moisture swells the layers and that upon heating the layers are more intimately bound or fused to form a more homogenous coating with indistinguishable striations.

In another embodiment the layered structure can be treated with a liquid, preferably a polar liquid, which enhances the swelling. Particularly preferred liquids for swelling the layered structure includes water, ethylene glycol, propylene glycol, glycerol, dimethyl sulfoxide (DMSO), N-methyl pyrrolidone or N,N-dimethylformamide (DMF). Treatment is preferably done by dipping due to the manufacturing efficiency provided thereby with other techniques, such as spraying, suitable for demonstration of the invention. After sufficient treatment to achieve swelling the liquid is removed by either reduced pressure, increased temperature or some combination thereof at a rate sufficient to avoid surface drying or skinning. The temperature is preferably no more than the boiling point of the liquid even though this temperature can be exceeded if surface drying is not caused by the more rapid liquid removal. Temperatures of 25° C. to 150° C. are suitable for demonstration of the invention with glycerol.

In yet another embodiment the layered structure can be treated with an aqueous or nonaqueous solution of a chemical that can help to swell the layered structure. Particularly preferred solvents include water; alcohol such as ethanol or isopropanol; ketones such as acetone or methyl ethyl ketone; ethers; esters such as ethyl acetate or isoamyl acetate or ring based polar solvents such as tetrahydrofurane (THF). Suitable solutes include any compound that helps to swell the layered structure. In addition to the polar liquid mentioned in the above embodiment, particularly preferred solutes also include polar solid compounds such as polyols including sorbitol, mannitol, sucrose and lactose and amino acids including glycine, alanine and lysine. Treatment is preferably done by dipping due to the manufacturing efficiency provided thereby with other techniques, such as spraying, suitable for demonstration of the invention. After sufficient treatment to achieve swelling the parts are dried to at least partially remove the solvent by either reduced pressure, increased temperature or some combination thereof at a rate sufficient to avoid surface drying or skinning. The temperature is preferably no more than the boiling point of the liquid even though this temperature can be exceeded if surface drying is not caused by the more rapid liquid removal. Temperatures of 25° C. to 150° C. are suitable for demonstration of the invention with aqueous solution.

In yet another embodiment layered structure can be treated with vapor of any liquid or solute mentioned in the above embodiment. Heat can be optionally applied to speed up the swelling and fusing of conductive polymer layers.

The primer preferably comprises a cross-linker and a weak ionic acid counter-ion.

The weak ionic acid counterion preferably comprising multiple carboxylic acid groups and has a preferred pKa of at least 0.25 to no more than about 6. More preferably the weak ionic acid counterion has a pKa of at least 2.15 to no more than about 6. Below a pKa of about 0.25 the finished part fails in accelerated reliability test. Above a pKa of about 6 the ionic acid is insufficiently ionic to function as a suitable counterion. Acids containing multiple carboxyl groups on a linear or branched hydrocarbon of at least one to 20 carbons, are particularly preferred. Above about 20 carbons the solubility of the weak ionic acid counterion becomes limiting. A particularly preferred weak ionic acid counterion is selected from the group consisting of acetic acid, 1,2,3,4-butanetetracarboxylic acid, lysine and butanetetraacetic acid Typical primers, particularly, and cross-linkers are known to be detrimentally impacted by moisture due, presumably, to their ionic nature. Aluminum is particularly known to be detrimentally impacted by the presence of moisture. It has therefore been considered necessary to avoid high moisture conditions during the manufacture of capacitors utilizing intrinsically conducting polymer due to the presence of the primers specifically. In a surprising development, the use of relatively high moisture and heat, as set forth elsewhere herein, fuses adjacent layers of the intrinsically conductive polymer thereby achieving superior properties, particularly ESR, of the resultant capacitor. This result is contrary to the expectation of those of skill in the art. The surprising realization that moist heat improves inter-layer bonding within the layers of intrinsically conducting polymer allows for the use of previously unsuitable weak counter ions thereby greatly improving the reliability characteristics of the capacitor. The result is a capacitor with improved stability upon aging and subsequent use.

The cross-linker is preferably a diamine, triamine, oligoamine or derivatives thereof wherein oligoamine refers to compounds comprising at least four amine groups such as tetramine, pentamine, hexamine, heptamine, octamine, nonamine, decamine, undecamine, dodecamine, etc. Particularly preferred amines are selected from aliphatic amines, amides, aromatic amines, amino acids, polymeric amines, and polyether amines.

Aliphatic amines including α,ω-diamines such as 1,4-diaminocyclohexane or 1,4-bis aminomethyl(cyclohexane), or

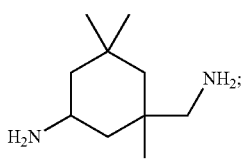

linear aliphatic α,ω-diamines or derivatives thereof such as ethylenediamine, 1,6-hexanediamine, 1,7-heptanediamine, 1,8-octanediamine, 1,9-nonanediamine, 1,10-decanediamine or 1,12-dodecanediamine N,N-dimethylethylenediamine, N,N,N'N'tetramethyl-1,4, butanediamine, N,N,N,N'N'N;-hexamethylhexanemethylene-diammonium dibromide, piperazine, 1,4-diazabicyclo[2.2.2]octane, N,N,N'N-tetrakis(2-hydroxypropyl)ethylenediamine, N-[3-(trimethoxysilyl) propyl]ethylenediamine or 1,4-bis(3-amino-propyl) piperazine; amides such as N,N'-diacetyl-1,6-hexanediamine, N,N,N'N'-tetraacetylethylene-diamine, 1,4-diformylpiperazines or N,N'-ethylenebis(stearamide); aliphatic amines, including linear aliphatic amines, having at least three amino groups such as 1,4-bis(3-aminopropyl)piperazine, N-(6-aminohexyl)-1,6-diaminohexane or N-(3-aminopropyl)-1,4-diaminobutane or 3-[2-(2-aminoethylamino) ethyleneamino]propyltrimethoxysilane; aromatic amines having at least two amino groups such as brilliant green, 4,4'-methylenebis(N,N-diglycidylaniline), o-phenylene-diamine, m-phenylenediamine, p-phenylenediamine, 1,5-diaminonaphthalene, 1,8-diaminonaphthalene, 2,3-diaminonaphthalene, 3-aminophenyl sulfone, 4-aminophenyl sulfone, 4-aminophenyl ether, 3-3'-diaminobenzidine, 2-(4-aminophenyl)ethylamine, 4,4'-methylenendianiline, 2,6-diamiotoluene, N,N,N'N'-tetramethyl-p-phenylenediamine, 4,4'-bis (diethylamino)benzophenone, 4,4'-bis(dimethyl-amino) benzhydrol, 3,3',5,5'-tetramethylbenzidine, Auramine O, Rubine S, m-xylenediamine, phthalein, complexone, Brilliant Blue G, folic acid; aromatic triamines such as 4,4',4"-methyliditetris(N,N-dimethylaniline); polymeric amines such as poly(propylene glycol)bis(2-aminopropyl)ether, polyethyleneimine and poly(allylamine), ethoxylated polyethyleimine; and polyethers such as NH$_2$—(CH$_2$)$_x$(CH$_2$CH$_2$O)$_y$(CH$_2$)$_z$—NH$_2$, wherein x and z are an integer from 0 to 3 and y is an integer from 2 to 8, and imidazole derivatives.

Solid electrolytic capacitors generally comprise a porous metal anode, an oxide layer on the anode, typically an oxide of the anode metal, and an electrically conductive solid cathode, such as manganese dioxide or an intrinsically conductive polymer, incorporated into the pores and onto the dielectric. The porous structure gives high surface area. An advantage of the high surface area is that a very high capacitance can be achieved. Additional layers, such as silver and carbon layers, are then added to aid in contact formation.

The solid electrolytic capacitors typically incorporate valve metals or conductive oxides of valve metals with tantalum, aluminum, niobium and niobium oxide being mentioned as particularly preferred.

The dielectric is typically formed as an oxide of the anode metal without limit thereto. Dielectric formation is well documented in the art and the method of dielectric formation is not limited herein.

Conductive polymers are particularly suitable for use as the electrically conductive solid cathode with polyaniline, polypyrroles and polythiophenes being most preferred. A particularly preferred polymer for use as a cathode is polythiophene. The polymer layer inside the pores can be formed by chemical polymerization wherein the internal conductive layer is formed by dipping the anodized substrate first in a solution of monomer of the conductive polymer. After a drying step, the anode bodies are then immersed in a solution comprising oxidizer and dopant. The chemical polymerization cycle can be repeated multiple times to achieve the desired coverage of the surface inside the pores. The polymer layer inside the pores can also be formed by dip coating using a solution or dispersion of conductive polymer. When a solution of conductive polymer is utilized a diluted solution is preferred so that the solution viscosity would be sufficiently low to allow diffusion of the solution into the porous structure. In case of a dispersion of the conductive polymer the particle size must be sufficiently small to allow impregnation of the porous structure.

A layer of conductive polymer can be applied with a slurry or dispersion of the conductive polymer. It is preferred to include a dopant in the polymer as known in the art. A particularly preferred dopant is the sodium salt of polystyrenesulfonate (PSS) or polestersulfonate (PES).

The conducting polymer is preferably an intrinsically conducting polymer comprising repeating units of a monomer of Formula I:

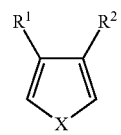

Formula I $R^1$ and $R^2$ of Formula I are preferably chosen to prohibit polymerization at the β-site of the ring. It is most preferred that only α-site polymerization be allowed to proceed. Therefore, it is preferred that $R^1$ and $R^2$ are not hydrogen. More preferably $R^1$ and $R^2$ are α-directors. Therefore, ether linkages are preferable over alkyl linkages. It is most preferred that the groups are small to avoid steric interferences. For these reasons $R^1$ and $R^2$ taken together as —O—(CH$_2$)$_2$—O— is most preferred.

In Formula I, X is S, Se or N. Most preferably X is S.

$R^1$ and $R^2$ independently represent linear or branched $C_1$-$C_{16}$ alkyl or $C_1$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or OR$_3$; or $R^1$ and $R^2$ taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R_3$ preferably represents hydrogen, linear or branched $C_1$-$C_{16}$ alkyl or $C_1$-$C_{18}$ alkoxyalkyl; or are $C_3$-$C_8$ cycloalkyl, phenyl or benzyl which are unsubstituted or substituted by $C_1$-$C_6$ alkyl.

More preferably $R^1$ and $R^2$ independently represent —CH$_3$, —CH$_2$CH$_3$; —OCH$_3$; —OCH$_2$CH$_3$ or most preferably $R^1$ and $R^2$ are taken together to represent —OCH$_2$CH$_2$O— wherein the hydrogen can be replaced with a solubilizing group, a halide or an alkyl.

A solvent is defined as a single solvent or a mixture of solvents.

It is preferable to apply the dispersion comprising the conductive polymer at a pH of no more than 10 and more preferably no more than 8 with below 7 being more preferred and below 6 being especially preferred.

The conductive polymer dispersion is applied onto the primer to form a layer that covers the edges and corners of the anodes. The application of primer layer and the conductive polymer layer can be repeated multiple times to achieve enough thickness and completeness of coverage. Without limit thereto 2-10 cycles of primer and conductive polymer layer application are suitable for demonstration of the invention. Each application of conductive polymer may use a unique composition and a unique solution or an identical or similar material may be used for the various dipping steps. A preferred thickness of the conductive polymer layer is at least 2 micrometers to no more than 50 micrometers. A more preferred thickness of the conductive polymer layer is from at least 2 micrometers to no more than 40 micrometers. An even more preferred thickness is from at least 3 micrometers to no more than 30 micrometers. If the layer of conductive polymer is below about 2 micrometers the dielectric is not adequately covered resulting in defective capacitors. If the conductive polymer layer is over about 50 micrometers the equivalent series resistance of the resulting capacitor is compromised.

In one embodiment a nanoparticle dispersion is applied after formation of the initial conductive polymer layer and after formation of subsequent conductive polymer layers. The sequence of applying the nanoparticle dispersion material followed by a conductive polymer layer is repeated until the desired layer thickness is reached. Without limit thereto 2-10 cycles of the nanoparticle dispersion and conductive polymer layer application is suitable for demonstration of the invention. Nanoparticle dispersions comprise nanoparticles with the nanoparticles having a particle size of no more than 100 nm and more preferably no more than 50 nm. Nanoparticles of the nanoparticle dispersion are selected from aluminum oxide, zinc oxide, silicon oxide and cerium oxide. These nanoparticle dispersions are available from Byk Additives And Instruments under commercial name Nanobyk 3600 for aluminum oxide, Nanobyk 3810 for cerium oxide and Nanobyk 3820 for zinc oxide.

HAST is Highly Accelerated Stress Test wherein a sample can be tested for corrosion resistance under electrical bias at 121° C. and 85% RH. HAST testing typically requires about 1-200 hours. For the purposes of the instant disclosure b-HAST refers to a test under electrical bias and ub-HAST is the same test without electrical bias.

Figure 4:
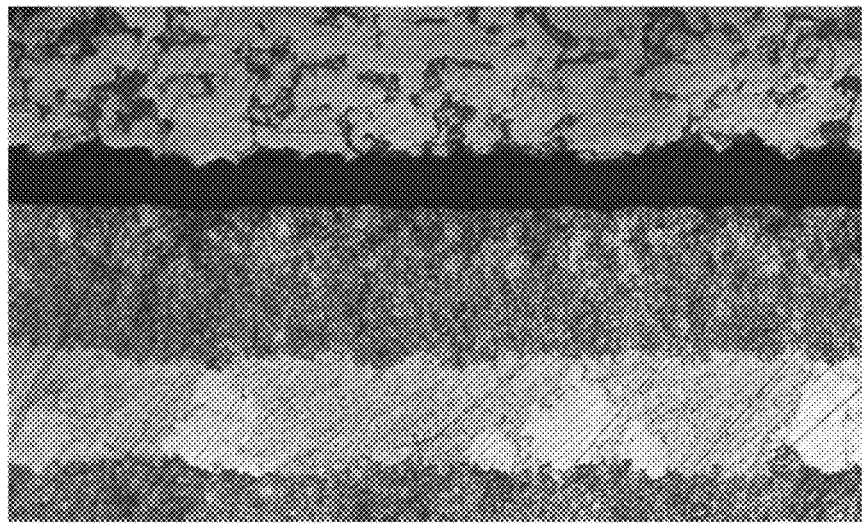
FIG. 4 is a cross-sectional view of a cathode layer without inventive treatment.
Figure 5:
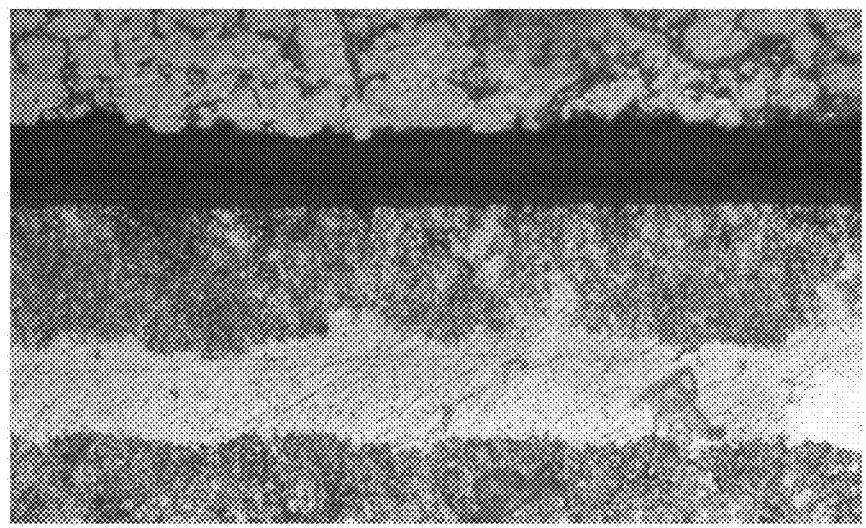
FIG. 5 is a cross-sectional view of a cathode layer with inventive treatment.

A surprising result is presented in the present disclosure. When weak ionic counter ions, as defined elsewhere herein, are utilized especially with the cross-linker the initial results are negative in that the ESR rises to an unacceptable level even though superior covering of the dielectric is observed. This has led to those of skill in the art avoiding weak counterions. It is surprisingly found that by the application of moist heat at a temperature and humidity as set forth elsewhere herein the ESR lowers to a level which is comparable to prior art wherein strong acid counter-ions are used. While not limited to the theory, the improved treatment is thought to improve inter-layer adhesion. FIG. 4 illustrates a cross-sectional view of the intrinsically conducting polymeric cathode layer, coated using conventional Clevious® K Primer W, in a solid electrolytic capacitor treated by conventional drying techniques. Inter-layer striations are easily observed which are believed to separate upon aging. FIG. 5 illustrates an identically prepared layer treated at 121° C. in 85% relative humidity wherein the striation is not observed and the intrinsically conducting polymer layer appears to be a continuous layer which does not as easily delaminate upon aging.

Moist heat, especially with aluminum, has long been considered detrimental due to anode degradation. It is surprisingly found that with weak ionic counterions moist heat can be used, preferably with a post heating step, to provide an improved capacitor exhibiting relatively low ESR, good stability during manufacturing process and low leakage current with aluminum anodes as well as improved reliability. The anode does not suffer from corrosion as is commonly realized with prior art strong acid counterions. In yet another surprising result, when the inventive capacitor is subsequently dried, the ESR and leakage current remain low during subsequent processing.

The unique combination of specifically selected weak ionic counterions, and specific processing conditions, provides a capacitor with a low ESR, uniform cathode deposition, minimal anode corrosion even under harsh conditions and the ESR and leakage current remain low during subsequent processing. Such a combination of advantages is difficult to otherwise achieve in the art.

Though not limited to theory, experimental evidence suggests that the combination of the cross-linker and weak ionic counter ion react to form an uncharacterized product which improves adhesion, or cohesion, within the layer of the conductive polymer layer. Through designed experiments with dodecylamine and butanetetracarboxylic acid following treatment as described elsewhere herein a thermal analysis indicates melting properties which are not consistent with either the dodecylamine or the butanetetracarboxylic acid.

EXAMPLES

Test 1

A series of capacitors were formed on an aluminum anode with aluminum oxide dielectric. The dielectric was coated with a commercially available primer comprising dodecane diamine and toluene sulphonic acid available as Clevios® K Primer W from Heraeus. A layer of intrinsically conducting 3,4-ethylenedioxythiophene polymer available as Clevios® KV2 from Heraeus was formed on the dried primer. The capacitor was tested for ESR, the ratio of edge to body coating thickness and b-HAST. The results are presented in Table 1 as Comparative 1.

Test 2

A series of capacitors were formed on an aluminum anode with aluminum oxide dielectric. The dielectric was coated with a primer comprising dodecane diamine and 1,2,3,4-butanetetracarboxylic acid in a 1:1 molar ratio. Sequential layers of intrinsically conducting 3,4-ethylenedioxythiophene polymer available as Clevios® KV2 from Heraeus were formed on the dried primer. The capacitor was tested for ESR, the ratio of edge to body coating thickness and b-HAST. The results are presented in Table 1 as Inventive 1.

TABLE 1

| Sample | Solid ESR (Ohms) | Edge/Body ratio | b-HAST |
| --- | --- | --- | --- |
| Comparative 1 | 0.025 | 0.7 | fail |
| Inventive 1 | 0.050 | 0.9 | pass |

As the results of Table 1 indicate Inventive 1 has superior thickness uniformity with a near equal thickness at the edges and the body. The inventive example 1 also has superior results in accelerated reliability test. The inventive example 1 suffers from an increase in ESR.

Test 3

A series of capacitors from Comparative 1 and Inventive 1 were separated and subjected to 260° C. infrared heat treatment and to an oven heat treatment at 125° C., 150° C., and 175° C. for 2 hours. Under infrared heating conditions both samples demonstrated a slight increase in ESR. No obvious insulation layer was observed in cross-sectional views. A series of capacitors was also heated at 85° C. and 85% humidity at rated voltage and without voltage. ESR did not decrease.

Test 4

A series of capacitors from Comparative 1 and Inventive 1 were separated and subjected to treatment at 121° C. and 85% relative humidity at rated voltage and under identical conditions without voltage. Inventive 1 demonstrated a significant decrease in ESR from a mean of about 0.050 Ohms to a mean of about 0.020 Ohms which is comparable to Comparative 1 without the treatment. Furthermore, in subsequent dry heating at 125° C. for 24 hours leakage current after the treatment, both with and without voltage, was stable and acceptable.

Test 5

A series of capacitors from Comparative 1 and Inventive 1 were prepared, with the exception that two layers of intrinsically conductive polymer were applied sequentially. The samples were separated and subjected to moist treatment at 121° C. and 85% relative humidity at rated voltage and under identical conditions without voltage. Inventive 1 demonstrated a significant decrease in ESR from a mean of about 0.050 Ohms to a mean of about 0.020 Ohms which is comparable to Comparative 1 without moist treatment. In further processing the ESR remained stable post molding. The finished capacitors with encapsulation were tested for 21 hours under HAST condition. Leakage current was stable and acceptable. In contrast, capacitors made from Comparative 1 showed severe increase in leakage current.

Another group of finished capacitors with encapsulation were passed through a Pb free SMT reflow with a peak temperature of 260° C. five times. ESR was stable and acceptable. In comparison, capacitors made from Comparative 1 showed significant increase in ESR. Table 2 lists the ESR values in Ohms for parts made from Comparative 1 and Inventive 1 from different tests.

TABLE 2

| Sample | Post molding | End of line | 5 Pass Reflow | Post b-HAST |
|---|---|---|---|---|
| Comparative 1 | 0.014 | 0.023 | 0.036 | 0.143 |
| Inventive 1 | 0.011 | 0.014 | 0.016 | 0.022 |

As realized from the examples, moist treatment of layers of an intrinsically conducting polymer over a primer, particularly a weak ionic counterion, results in improved inter-layer adhesion. Subsequent heating even further improves the ultimate capacitor as evidenced by aging characteristics.

Test 6

A series of capacitors from Comparative 1 and Inventive 1 were separated and subjected to treatment by dipping in glycerol for 5 mins followed by drying at 130° C. for 30 mins. Inventive 1 demonstrated a significant decrease in ESR from a mean of about 0.050 Ohms to a mean of about 0.026 Ohms which is comparable to Comparative 1 without the treatment.

The invention has been described with reference to the preferred embodiments without limit thereto. One of skill in the art would realize additional embodiments and improvements which are within the meets and bounds of the invention as more specifically set forth in the claims appended hereto.

The invention claimed is:
1. A process for forming a capacitor comprising:
providing an anode comprising a dielectric thereon;
applying a first layer of an intrinsically conducting polymer on said dielectric to form a capacitor precursor;
applying at least one subsequent layer of an intrinsically conducting polymer on said first layer of an intrinsically conducting polymer from a dispersion; and
treating said capacitor precursor at a temperature of at least 50° C. to no more than 200° C. at a relative humidity of at least 25% up to 100%.

2. The process for forming a capacitor of claim 1 further comprising applying a primer layer prior to said applying of said first layer of said intrinsically conducting polymer or prior to applying said subsequent layer of said intrinsically conducting polymer.

3. The process for forming a capacitor of claim 2 wherein said primer layer comprises a weak ionic counterion.

4. The process for forming a capacitor of claim 3 wherein said weak counterion has a pKa of at least 0.25 to no more than 6.

5. The process for forming a capacitor of claim 4 wherein said weak counterion has a pKa of at least 2.15 to no more than 6.

6. The process for forming a capacitor of claim 5 wherein said weak ionic counterion comprises multiple carboxylic groups.

7. The process for forming a capacitor of claim 6 wherein said weak ionic counterion comprises 1 to 20 carbons.

8. The process for forming a capacitor of claim 6 wherein said weak ionic counterion is selected from the group consisting of acetic acid, 1,2,3,4-butanetetracarboxylic acid, lysine and butanetetraacetic acid.

9. The process for forming a capacitor of claim 2 wherein said primer layer comprises a cross-linker.

10. The process for forming a capacitor of claim 9 wherein said cross-linker is an amine.

11. The process for forming a capacitor of claim 10 wherein said cross-linker is selected from diamine, triamine, oligoamine and derivatives thereof.

12. The process for forming a capacitor of claim 2 wherein said primer comprises dodecane diamine and 1,2,3,4-butanetetracarboxylic acid.

13. The process for forming a capacitor of claim 1 wherein said applying of said first layer or said subsequent layer of said intrinsically conducting polymer comprises dipping into a dispersion of said intrinsically conducting polymer.

14. The process for forming a capacitor of claim 1 wherein said anode is a valve metal or a conductive oxide of said valve metal.

15. The process for forming a capacitor of claim 14 wherein said anode is selected from the group consisting of tantalum, aluminum, niobium and niobium oxide.

16. The process for forming a capacitor of claim 15 wherein said anode comprises aluminum.

17. The process for forming a capacitor of claim 1 wherein said treating is at a temperature of at least 115° C. to no more than 130° C.

18. The process for forming a capacitor of claim 1 wherein said treating is at a relative humidity of at least 75%.

19. The process for forming a capacitor of claim 1 wherein said intrinsically conducting polymer is selected from the group consisting of polyaniline, polythiophene and polypyrrole and their derivatives.

20. The process for forming a capacitor of claim 1 wherein said intrinsically conducting polymer is a polythiophene or a derivative thereof.

21. The process for forming a capacitor of claim 20 wherein said intrinsically conducting polymer is polymeric 3,4-ethylenedioxythiophene.

\* \* \* \* \*